H. J. BICKLE & M. WILSON.
SCRAPER.
APPLICATION FILED JULY 8, 1908.
934,653.
Patented Sept. 21, 1909.
2 SHEETS—SHEET 1.
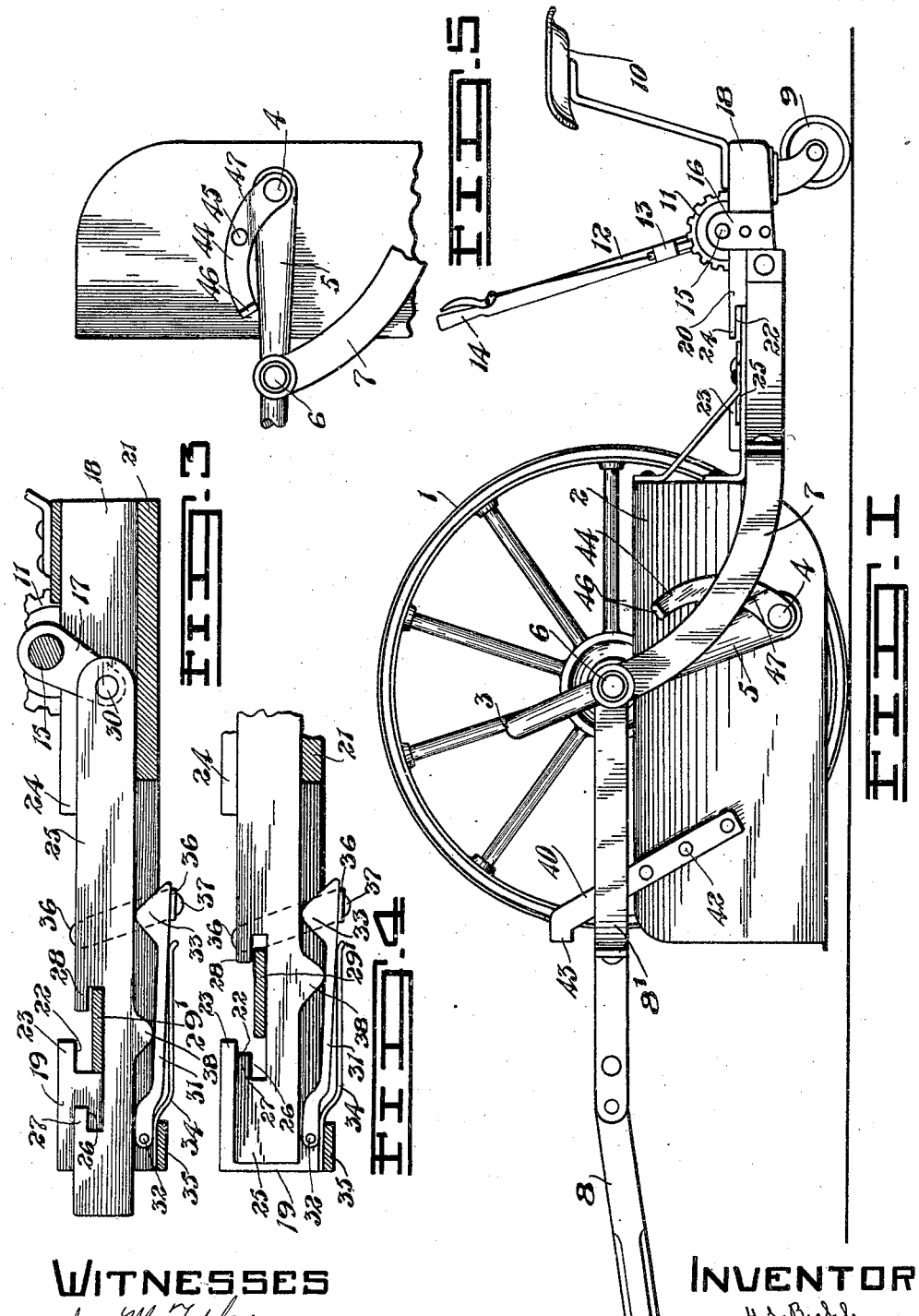
WITNESSES
INVENTORS H. J. BICKLE & M. WILSON.
SCRAPER.
APPLICATION FILED JULY 8, 1908.
934,653.
Patented Sept. 21, 1909.
2 SHEETS—SHEET 2.
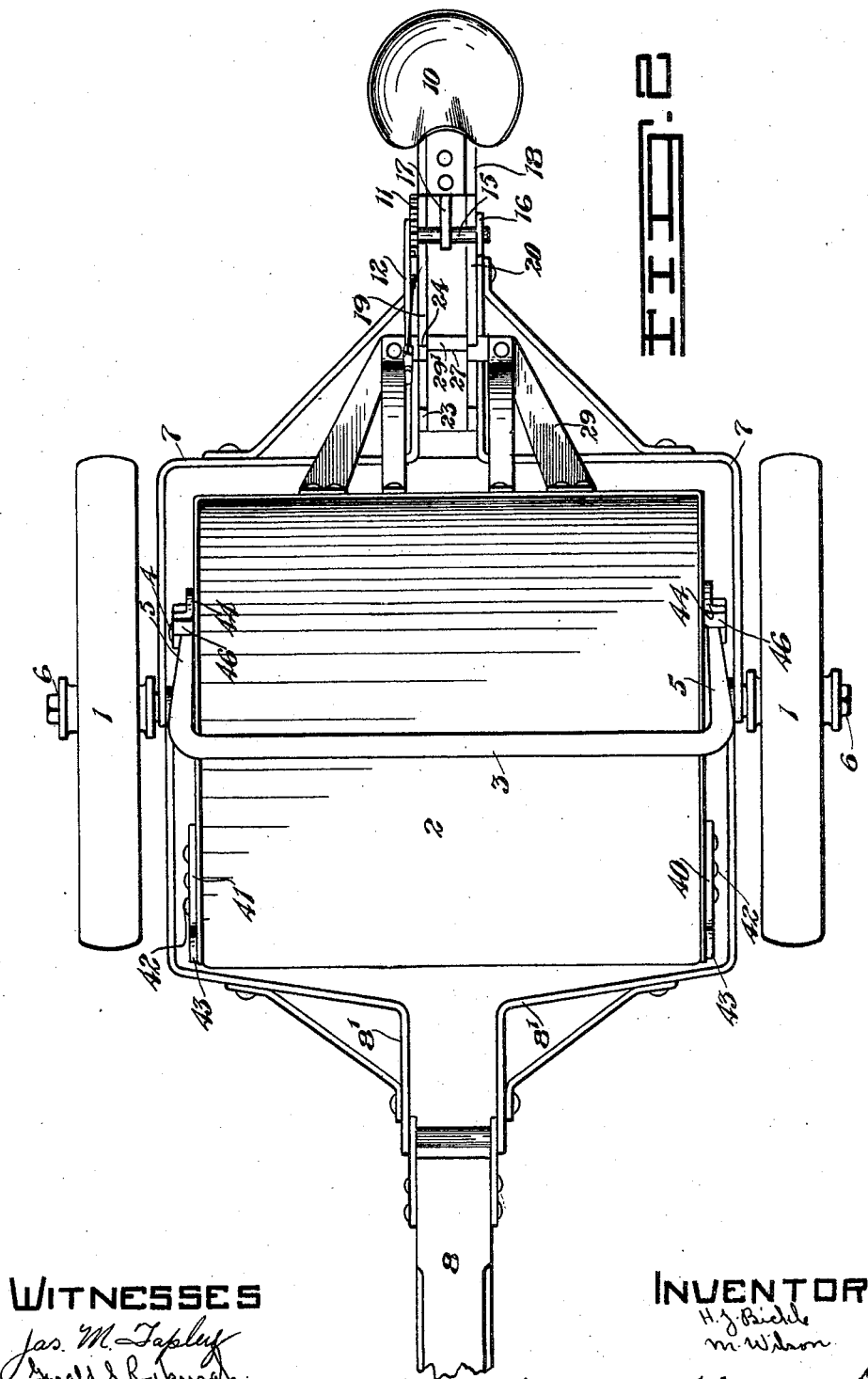
WITNESSES
INVENTORS

UNITED STATES PATENT OFFICE.

HENRY JAMES BICKLE AND MAGNUS WILSON, OF GLADSTONE, MANITOBA, CANADA.

SCRAPER.

934,653.          Specification of Letters Patent.     Patented Sept. 21, 1909.

Application filed July 8, 1908. Serial No. 442,575.

*To all whom it may concern:*

Be it known that we, HENRY JAMES BICKLE and MAGNUS WILSON, both of the town of Gladstone, in the Province of Manitoba, Canada, have jointly invented certain new and useful Improvements in Scrapers, of which the following is the specification.

Our invention relates to improvements in scrapers, such improvements being particularly directed to a machine as described in United States Patent #866615, and the objects of the invention are firstly, to provide means which will prevent the pan from dumping when it is lifted after having taken a fill, secondly to provide means which will cause the pan when dumped to clear itself of the material carried by it, and thirdly to provide means to reinforce or strengthen the pan when filling. To this end our invention consists in certain details of construction and combination of parts, as hereinafter more fully set forth in the specification, and later claimed.

Figure 1 is a side elevation of the scraper with the improvements attached, one of the carriage wheels being removed. Fig. 2 is a plan view of the scraper as in Fig. 1. Fig. 3 is an enlarged detailed side elevation of the locking bar in position within the drag bar, a portion of the drag bar being removed and showing an attachment carried by the locking bar. Fig. 4 is a view of the locking bar in an alternative position to that shown in Fig. 3. Fig. 5 is a side elevation of a portion of the pan and an attachment on the pan adapted to engage with the pan suspending bar, the pan being shown in the dumped position.

In the drawings like characters of reference indicate corresponding parts in each figure.

With a machine constructed in accordance with the description as given in the hereinbefore mentioned patent it has been found that it was almost impossible to throw the lever, after having taken a fill, quickly enough to prevent the pan from dumping before it was raised. Also it has been found that the material after the pan has been dumped takes a considerable time to pass completely from the pan as the tip of the pan drags on the ground and prevents the earth from escaping quickly enough. It was also noticed in using the machine that a considerable strain was brought on the pan when filling, which it would be better, if possible, to avoid. This was caused by the pan tending to dig deeper into the ground as the scraper advanced.

To overcome the difficulties just described is the object of the present invention.

Referring now to the drawings 1 1 represent the carriage wheels, and 2 the pan which is of the ordinary form.

3 is the bar suspending the pan, such bar being fastened by bolts 4 passing through the extending ends 5.

6 are stub axles secured to the members 5 and upon which are mounted the carriage wheels 1.

7 are side bars which form practically the framework of the scraper, such bars being pivoted or centered on the stub axles and passing rearwardly behind the pan where they are connected to drag bars as later described.

8 is the tongue secured to the draft bars 8' which pass forwardly of the scraper and are connected with the stub axles.

9 is a caster wheel supporting the rear end of the drag bar and 10 is a seat fastened to the drag bar in the usual manner.

11 is a segment firmly secured to the side of the drag bar and forward of the seat.

12 is a lever operating over the segment, such lever being supplied with the usual detent 13 and hand latch 14, the detent engaging with the segment.

15 is a cross shaft extending at right angles from the lower end of the lever and mounted in bearings formed in a standard 16 at one end and in bearings formed in the body of the segment at the other.

On the rod is centered a short link 17 which turns with the rod and the link is interconnected with the locking bar as later described.

The portions hereinbefore described are of the same form as the corresponding parts, as described in the patent hereinbefore mentioned, particular attention being paid to that portion of the description which relates to the second embodiment of the machine in which the pull scraper is described.

The drag bar 18 instead of being a tube as before is of channel bar cross section, the uprights 19 and 20 of which are interconnected by a longitudinal spacing plate 21. The side bars 7 are fastened to the uprights 19 and 20 in the same manner as the corresponding bars in the prior patent are fastened to the tubular drag bar. The uprights have each opposing portions 22 cut away in their upper sides thereby forming two overhanging portions 23 and 24.

25 is the locking bar which is adapted to slide between the uprights 19 and 20 and over the interconnecting plate 21, and it has a portion 26 cut away forming at the sides two overhanging members 27 and 28.

29 is a flat extending V-shaped bar secured to the rear of the pan and designed so that the rearmost portion 29' may pass into the incision formed in the locking bar.

It is to be understood that although the portions just described, i. e., the locking bar; the drag bar; and the V-shaped bar, are somewhat modified in form to those described in the patent above referred to, yet they serve the same purpose and fulfill the same conditions as they did formerly. The changes in construction have been made for the reason that it has been found more convenient to place the attachments on a channel-shaped drag bar than on a tubular bar. The rear end of the locking bar is pivotally interconnected with the arm 17 by a pin 30.

31 is a trip rod pivotally interconnected with the uprights 19 and 20 by a cross pin 32. The trip is positioned directly beneath the free end of the locking bar and has an enlargement 33 formed at the upper side of the extending end.

34 is a flat spring secured to the cross plate 35 and extending beneath the trip rod, the tendency of the spring being to continuously force the bar upwardly.

36 is an angular shaped trip bar secured to the trip rod by bolts 37. The free end of the bar passing normally immediately to the side of the upright 19 and extending upwardly.

38 is an enlargement formed on the under side of the locking bar toward the free end of the bar.

In order to better understand the value of these latter attachments and interconnections, we will now describe their use, assuming the pan to be in the down or filling position. In this case the portion 29' of the bar 29 is in its forward position as shown in Fig. 3 of the drawings and the locking bar is retaining the bar 29 in such position. With the draft animals pulling forwardly the tendency would be for the pan to dump if it were not held by the locking bar, that is by the overhanging portion 28. The portion 29' of the bar 29 cannot release itself until the overhanging portion 28 passes from above it, and this will not take place until the portion 29' reaches approximately the position shown in Fig. 4. If the locking bar were drawn backwardly to this latter position, and the lever not thrown quickly enough it would escape and the pan would dump. However, with the attachments herein described, it will be seen that immediately the locking bar and the portion 29' of the bar 29 assume relatively the positions shown in Fig. 4 the portion 29' is abutting the upwardly directed arm of the trip bar 36. In this position it is impossible, even if the locking bar be released, for the portion 29' to escape as any upward tendency is overcome by the bar 36. With the portion 29' so held, the locking bar is drawn back by the lever, until the overhanging portion 27 passes partially over the edge of the portion 29'. As it passes over, the enlargement 38, travels toward and engages with the enlargement 33 forcing the trip rod downwardly, thereby releasing the trip plate from the portion 29', and the locking bar alone holds the portion 29', and controls the pan until it is raised completely.

40 and 41 are similar bars securely fastened by bolts 42 to the sides of the pan, such bars being inclined upwardly and having their upper ends considerably above the pan. The bars have their upper extremities 43 turned at an angle to the body portion and such ends are adapted to engage with the bars 8', when the pan is in the filling position, that is down. In this way it will be seen that such bars tend to reinforce the pan, as they form when operating a tie between the pan and the bars 8'. As soon as the pan is raised the bars 40 and 41 pass upwardly from the bars 8', and in no manner interfere further with the operation of the pan.

44 are plates secured by bolts 45 to the pan, one at each side and directly opposite. The plates have, each, one of their ends 46 at right angles to body portion, or in other words, directed outwardly from the side of the pan, such ends being adapted to engage in certain positions of the pan with the pan suspending bar 3. The other ends of such plates are centered on the bolts 4, and the plates are bent at 47 to pass over the outer face of the extending ends 5 of the bar 3.

Without the attachments 44, 45, 46 and 47, the point of the scraper, when dumped, would be forced back till the scraper assumed practically a horizontal position while turning on the stub axles. As soon as it took this position, it would turn on the bolts and incline backwardly, and the back of the scraper would be jammed against the cross bars which hold the releasing bar. Consequently, when the machine continued to go forward, the scraper could not rise on account of jamming, and the earth would not escape quickly. With the attachments, however, when the pan assumes the vertical position, as shown in Fig. 5, the attachments engage with the bar 5 and the pan cannot swing further without turning on the stub axles. This means that when the team is advancing, the pressure of the earth on the point of the scraper tends to swing it almost directly upwardly turning on the stub axles, and there is no binding against the cross bars at the back. Even if there were such a binding, the point of the scraper would have to be a considerable distance above the ground. Consequently, the earth is a great deal freer to pass from the pan.

What we claim as our invention is:

1. In a scraper the combination with the suspended pan, the V shaped bar extending rearwardly from the pan, the drag bar and the locking bar slidably secured within the drag bar; the said locking and drag bars having each incisions therein to receive and retain the V shaped bar, of means adapted to retain the V shaped bar within the incision within the locking bar when the locking bar is in the position which allows the escapement of the V shaped bar, as and for the purpose specified.

2. In a scraper the combination with the suspended pan, the V shaped bar extending rearwardly from the pan, the drag bar and the locking bar slidably secured within the drag bar, both of such bars having incisions therein forming overhanging portions adapted to retain the V shaped bar, of a spring pressed trip rod secured to the drag bar; a trip bar extending upwardly from the rod and designed to engage with the V shaped bar, and means for forcing the bar downwardly at a pre-determined instant, as and for the purpose specified.

3. In a scraper the combination with the suspended pan, the V shaped bar extending rearwardly from the pan, the drag bar and the locking bar slidably secured within the drag bar, both of such bars having incisions therein forming overhanging portions adapted to retain the V shaped bar, of a trip rod pivotally interconnected with the drag bar, such rod having an enlargement at the end thereof adapted to engage with an enlargement formed on the under side of the locking bar, a spring normally forcing the trip rod against the under side of the locking bar and a trip bar designed to engage with the V shaped bar at a pre-determined instant, as and for the purpose specified.

4. In a scraper the combination with the suspended pan, the V shaped bar extending rearwardly from the pan, the drag bar and the locking bar slidably secured within the drag bar, both of such bars having incisions therein forming overhanging portions adapted to retain the V shaped bar, of means for retaining the V shaped bar within the locking bar incisions when the overhanging portions are free of the V shaped bar, and means for causing such latter means to disengage from the V shaped bar when the overhanging portions pass over the V shaped bar, as and for the purpose specified.

5. In a scraper the combination with the pivotally suspended pan and the draft bars, of a set of hooked bars securely fastened to the pan and extending upwardly and forwardly, the hooked ends of such bars being adapted to engage with the draft bars when the pan is in the filling position, as and for the purpose specified.

6. In a scraper the combination with the pan and the pan suspending bar, of a set of plates secured one to each side of the pan, such plates having each, one of their ends extending outwardly from the pan and adapted to engage with the suspending bar when the pan is in the overturned position, as and for the purpose specified.

7. In a scraper the combination with the pan and the pan suspending bar pivotally interconnected to the pan by bolts, of a set of similar plates secured to the pan and having their one end directed outwardly from the pan and adapted to engage with the suspending bar when the pan is in the overturned position, and having their other end centered on the bolts interconnecting the pan with the suspending bar, as and for the purpose specified.

Signed at Gladstone, in the Province of Manitoba, this 13 day of June 1908.

HENRY JAS. BICKLE.
MAGNUS WILSON.

Witnesses:
E. G. EDWARDS,
S. GEORGE.